INVENTOR.
Oswald M. Bundy
BY Harry P. Canfield
Attorney

INVENTOR.
Oswald M. Bundy
BY Harry R. Canfield
Attorney

INVENTOR.
Oswald M. Bundy
BY Harry P. Canfield
Attorney

United States Patent Office 3,002,177

Patented Sept. 26, 1961

3,002,177

TERMINAL BOARD WITH WIRE CHANNEL

Oswald M. Bundy, Cleveland Heights, Ohio, assignor to The Clark Controller Company, Cleveland, Ohio, a corporation of Ohio Filed Nov. 1, 1957, Ser. No. 693,962
8 Claims. (Cl. 339—198)

The invention hereof relates to terminal boards of the type that are used on the control panels of electrical control apparatus; particularly in industrial control.

As is well known, the operations of machines, motors, and other kinds of apparatus are controlled by various kinds of electrical devices mounted collectively on control panels remote from the controlled apparatus; and some of the devices on the panel are connected electrically to the controlled apparatus; and some are electrically connected to others on the panel; and in some instances devices on one panel are connected electrically to those on another panel; and the said electrical connections are made by wires connected to designated terminals on the devices and wires connected to designated terminals on the controlled apparatus.

The device terminal, however, will rarely if ever be opposite or near to its corresponding board terminal, so that in the absence of countervailing provisions, there would be long runs of wire and crossings of wires between them, and this would inevitably result in a maze or tangled complex of wires on the panel.

This could be, and in some cases has been, obviated to some extent by arranging the wires, over a part of their length, in side-by-side groups, and taping or otherwise binding them together in the form of cables.

But such a cable assembly operation calls for skill and is time consuming and therefore costly.

This difficulty has led to the development of elongated channels or troughs, mounted on the panel, parallel to the terminal board, and coextensive longitudinally with it and spaced therefrom usually at a distance of 3 or 4 inches.

The channel has opposite spaced side walls rising from the panel and each side wall has numerous perforations therethrough from end to end of the channel.

By this means some one of the sidewall perforations will be directly opposite to or aligned with the device terminal, and the wire connected thereto at one of its ends can be directed in substantially a straight line and over a relatively short distance, through the aligned perforation, and into the channel.

Once in the channel, the wire can be bent into the direction of the channel and run along therein and be contained therein until it comes opposite to the corresponding board terminal; and because of the numerous perforations in the opposite channel sidewall, there will be one perforation substantially opposite to the board terminal, and the wire can be put through that perforation and its free end connected to the board terminal.

The said space between the terminal board and the channel is necessary to enable an operator to manipulate the free end of the wire to attach it to whatever attaching means has been provided as a part of the board terminal.

While such a terminal board and channel overcome some of the wiring difficulties above described, they are not satisfactory to use because the procedure of wiring with such a channel and board is time consuming; and because the terminal board and channel themselves introduce objections by the structure thereof, as follows:

The terminal board and channel being separate and in different pieces must be manufactured separately; and two means or sets of means for attaching them to the panel must be provided; and two assembly operations must be performed to mount them separately on the panel; all of which adds to the material and labor cost.

Also the overall width of a panel to accommodate a terminal board, plus the width of the channel, plus the space between them, undesirably increases the width of the panel and this, besides adding to cost, adds to the horizontal floor space taken up by the panel, and this space is often at a premium.

It is the primary object of the present invention to provide an improved structure to take the place of the known panel boards and channel structures of the class referred to, which will retain whatever advantages accrue from the use of the known structures, and which at the same time will have the advantages of reduced cost of material of its parts; and reduced space on the panel occupied by the parts; and reduced labor cost of the operation of mounting it on the panel and of the wiring operation in the use thereof, effected by making these operations simpler and less time consuming.

Another object is to provide a terminal board of the class referred to, constructed to obviate the need of a self-contained wiring channel to cooperate therewith.

Other objects will become apparent to those skilled in the art from a reading of the description of an embodiment of the invention hereinafter.

A brief description of the invention, in the embodiment thereof hereinafter described in detail, follows, the actual invention being that set forth in the appended claims.

A terminal board is provided comprising an elongated base having on its top a longitudinal series of bar-like, horizontal, transversely disposed straps, each having inner and outer wire attaching devices on its opposite ends.

The top of the base is provided with a central longitudinal wall and a longitudinal series of spaced transverse walls, providing chambers at the inner and outer sides of the central wall, into which the opposite ends of the straps project.

The central wall provides a back wall for each chamber, and adjacent transverse walls provide side walls thereof, the respective chambers being open inwardly or outwardly in the horizontal direction.

The underside of the terminal board base has a downwardly extending rib-like support; and extending generally horizontally therefrom is, architecturally speaking, a balcony, comprising a generally horizontal balcony floor wall, and at the end thereof an upstanding side wall constituting the balcony railing. The side wall is spaced horizontally from the inwardly open chambers.

The side wall and floor wall are preferably coextensive, longitudinally, with the elongated base; and the side wall has a longitudinal plurality of perforations therethrough.

The lower end of the rib-like support and the underside of the floor wall are in a common horizontal plane, to rest upon the face of a panel to jointly support the board base and its terminals at a suitable height from the panel; and the said parts are mounted on the panel by a longitudinal series of mounting devices, preferably screws projected downwardly through an intermediate portion of the floor wall and screwed into the panel.

All of the aforesaid parts, except the straps, wire attaching means and screws are integral and formed in one piece from insulating material, preferably by molding.

The wire attaching devices on the straps and attaching points on the devices on the panel have identifying numbers or symbols.

In use, a wire attached at one end to an identified point on a panel device, goes directly, rectilinearly, to the outside of the perforated side wall and through the nearest perforation therein, and then runs along inside of the side wall in the space between the side wall and the chambers, to a point opposite to a wire attaching device on a strap with the same identifying number or symbol.

As described, the chamber at the end of the strap opens into this space, and the wire attaching device thereon is directly exposed to the said other end of the wire, and that end of the wire is simply bent and attached to the strap by the wire attaching device.

As will be apparent, a self-contained channel is not needed and none is provided; and there is nothing corresponding to a channel wall through which the said other end of the wire must pass on its way to the wire attaching device and strap, as referred to hereinbefore.

The invention is fully disclosed in the following description of an embodiment thereof, taken in connection with the accompany drawing in which.

Figure 1:
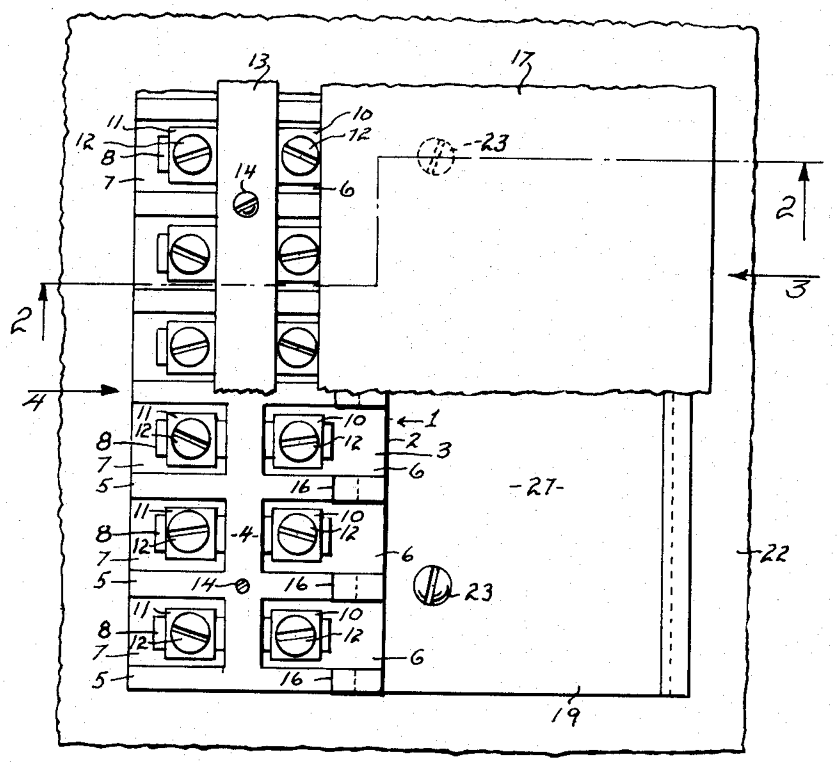
FIG. 1 is a top plan view of an embodiment of the invention, with parts broken away.
Figure 2:
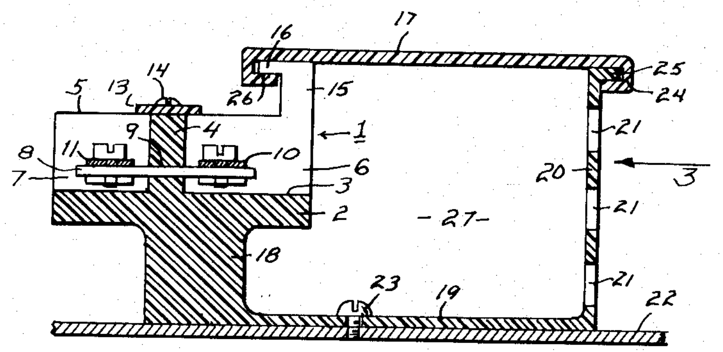
FIG. 2 is a cross sectional view taken from the staggered plane 2—2 of FIG. 1.
Figure 3:
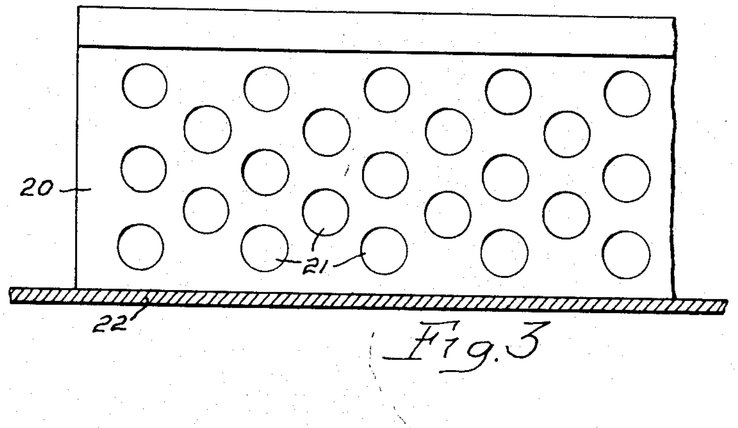
FIG. 3 is a side elevational view in the direction of the arrow 3 of FIG. 1.
Figure 4:
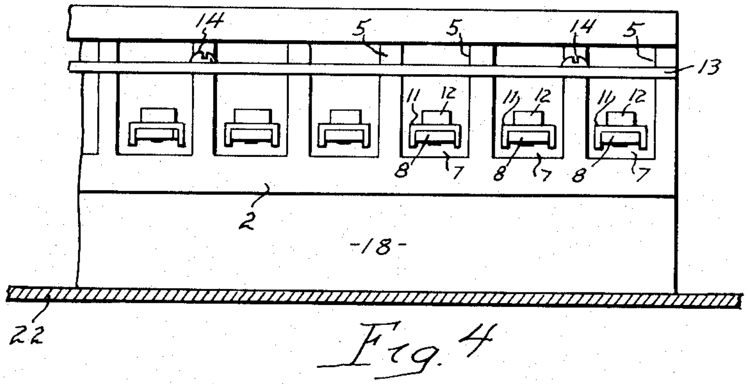
FIG. 4 is a side elevational view in the direction of the arrow 4 of FIG. 1.

Referring to the drawing, an elongated terminal board is shown at 1 comprising inner and outer shelf portions 2 which in the drawing, for convenience of illustration are shown as being elongated vertically and overhang the rib 18.

The rib 18 is integral with laterally extending shelves 2 and has a plane top surface 3, rising from which is a longitudinal center wall or web 4, along the center line of the surface 3, and a longitudinal series of transverse or lateral walls 5 intersecting the web 4. The lateral walls provide a longitudinal series of inner walled chambers 6 at the inner side of the web 4, and a like series of outer walled chambers 7 at its outer side.

For each of the chambers, the web 4 is a back wall, and the walls 5 are laterally extending side walls, with the surface 3 of the shelf portion functioning as a bottom wall; whereby the chambers 6 are open inwardly and the chambers 7 are open outwardly with all of them opening upwardly thereby giving free access thereto and to the terminals therein now to be described.

Bar-like straps 8—8 are projected horizontally through apertures 9 in the center wall with one end of each strap in a chamber 6 and the other end in a chamber 7, and inner and outer wire attaching devices 10 and 11 are provided on the respective end of the straps to thereby form a terminal.

The wire attaching devices 10 and 11 shown are of a known saddle type that straddle the straps 8—8 and have a screw 12 going through the device and threaded into the strap.

The straps 8—8 substantially fit the apertures 9 and are in general held stationary thereby, but in any event the wire attaching devices 10—11 are larger than the apertures and would prevent the straps from coming out of the apertures, and would retain each wire attaching device in its own chamber.

Other types of wire attaching devices may be used.

The chamber walls being formed from insulating material as will be referred to, the walls insulate each attaching device from the others, except of course the other attaching device on the same strap.

Each of the wire attaching devices 10 and 11 has an identifying number or other symbol assigned to it and to associate these identifications adjacent to the attaching devices where they can readily be found, an elongated strip 13 preferably of non-metallic material such as plastic is mounted on the tops of the transverse or lateral walls 5 with said numbers or symbols on it near its inner and outer edges, and each offset a little from the attaching device under it which it identifies, by a suitable width of the strip 13.

The strip 13 is secured to the walls by any suitable means, for example by screws 14 projected downwardly through the strip and threaded into the tops of at least some of the walls 5.

At least some of the transverse walls 5, at their inner ends, have integral posts rising therefrom, formed with outwardly open flange or hook portions 16 at their upper ends all in alignment longitudinally of the base to serve as retaining means for a detachable cover 17 to be described.

On the underside of the shelf portions 2 is a depending supporting rib 18, constituting part of the shelves 2 and longitudinally coextensive therewith.

Extending from the side of the structure thus far described and preferably from the lower end of the rib 18 are parts which, in terms of architecture, constitute a balcony.

A horizontal wall 19 constitutes the balcony floor and an upright wall 20 at the side of the floor constitutes the balcony railing.

The floor 19 and side wall 20 are preferably coextensive longitudinally with the shelf portions 2.

The side wall 20 is spaced from the terminal board shelves 2, the space being indicated at 27; and it has a plurality of closely adjacent perforations 21—21 therethrough over the full length of the wall.

The top of the side wall 20 has an outwardly extending flange 25 thereon, on a horizontal plane with and cooperating with said flange or portions 16.

The parts above described with the exception of the strip 13 and the metal straps 8—8 and their wire attaching devices 10 and 11, are all integral with each other, formed as a single or one piece structure, from insulating material, preferably by molding operations.

The lower end of the rib 18 and the under side of the floor wall 19 are in a common horizontal plane, to rest upon the panel, a fragment of which is shown at 22; and dispose all of the straps 8—8 at a like convenient height from the panel.

The whole described one-piece device is mounted on the panel by utilizing a single kind of mounting device, preferably a screw 23 projected through aligned holes in the floor wall 19 and in the panel 22 and screwed into the panel hole.

To simplify this operation, screws of the self-threading type are used which cut their own threads in the panel screw holes.

A series of such screws is disposed in a longitudinal line, preferably approximately midway between the rib 18 and side wall 20, and thus they position the said one piece structure on the panel; and hold the said common plane of the parts in firm contact with the panel, on the large areas of the parts, which stabilizes the terminal board and resists tendency thereof to shift or tip upon the application of force to manipulate the screws 12—12 of the wire attaching devices 10 and 11 of the straps 8—8.

As an illustrative operation or use of the one piece device when positioned and mounted on the panel as described, it will be considered that a device on the panel having an identified point for wire connection thereto is to be wired to a correspondingly identified wire attaching device 10 on a strap 8.

The wire is attached at one end to the point on the device and is led in a preferably rectilinear line directly to the outside of the side wall 20 and put through the nearest perforation 21, to the inside thereof.

It is then bent to run along the inside of the side wall 20 in the space 27 between the side wall and the terminal board base, until it comes to a point directly opposite to the correspondingly identified wire attaching device 10 on a strap. It is then simply bent laterally toward that strap and cut off to a suitable length and attached to the wire attaching device on that strap.

The panel may in some cases have many control devices thereon, and there may be accordingly many terminals on the terminal board; and as a consequence many wires running longitudinally in the space 27; and it may be desirable to cover the wires.

To this end the flange 25 on the side wall 20 is made parallel with the aligned flange portions 16 on the posts 15; and the said cover 17 is in the form of a horizontal wall provided with parallel longitudinally extending grooves 25 and 26, along its opposite side edges formed to receive and interlock with the flange 25 and flange portions 16 respectively.

The cover 17 when once in covering position, as illustrated with the flange 25 and flange portions 16 interlocked with the said groove 24 and 26 as referred to, will be retained in that position; but can be removed by sliding it longitudinally far enough to disengage the interlocked parts, or by bending the upper end of the side wall 20 inwardly to remove the flange 25 from the groove 24.

Similarly the cover 17 can be put in covering position by sliding it longitudinally to engage the interlock parts, or by bending the top of the side wall 20 inwardly until the groove 24 can be lowered over the flange 25 and then allowing the side wall to retract and put the flange 25 in the groove 24.

It will be apparent that no self-contained channel is provided, comprising two side walls and a bottom wall, none being needed; and that there is no channel having a channel wall through a perforation of which a wire must go from the interior of a channel on its way to a terminal on the terminal board, as mentioned in the premises describing prior terminal boards and prior practice.

It is believed that, in view of the premises, it will be understood, without further description, that the outer wire attaching devices 11—11 on the straps 8—8 are to have wires attached to them going to correspondingly identified terminals on the remotely located apparatus to be controlled.

A feature of primary importance of the one-piece molded device above described is that the inwardly open chambers 6—6 containing the wire attaching devices 10—10 open directly into the space 27, to which the wires have entrance, and that the ends of the wires in the space 27 have nothing between them and the wire attaching devices and can be connected directly to them.

The wires have entrance to the said space 27 laterally through the side wall perforations 21, as described.

However, it will be noted that the said space 27 is open at both ends of the one-piece device; and that if it were desirable for any reason or circumstance, for the wires to enter the space 27 from either open end, that could be done, and all of the above described advantages and improvements of the one-piece device would be had.

Figure 5:
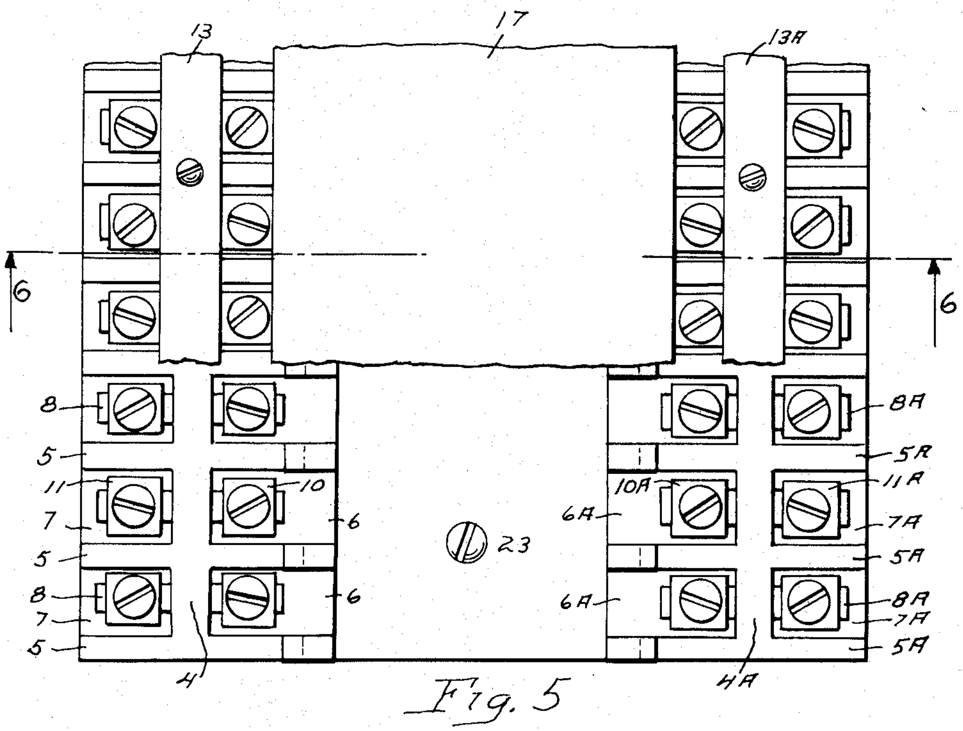
FIG. 5 is a view similar to FIG. 1 but showing a modification.
Figure 6:
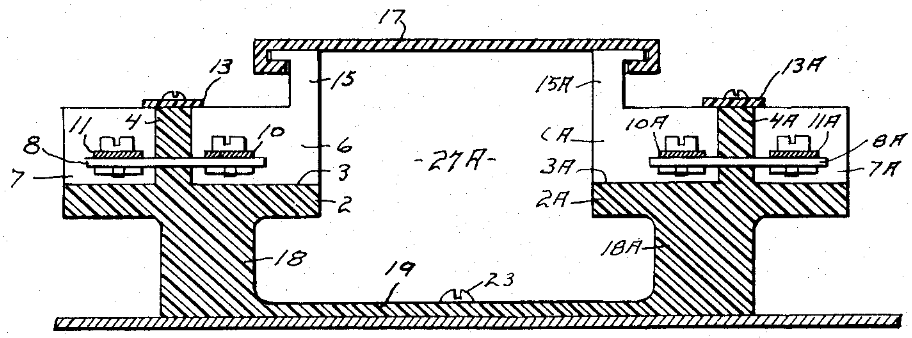
FIG. 6 is a cross sectional view from the plane 6—6 of FIG. 5.

However, in cases in which it is desirable to give entrance of the wires to the space 27 by way of one or both ends of the one piece device, as here referred to, it may be preferred to employ the one-piece device in the modified form of FIGS. 5 and 6.

In this form as illustrated, the construction on the left side, as viewed in the drawing, including the floor wall 19, is the same as that on the left side of the drawing in the first described form, FIGS. 1 to 4, and has been given the same reference characters and needs no further description.

At the right end of the floor 19 instead of providing a perforated wall 20 as in FIGS. 1 to 4, a "mirror" duplication of the parts at the left side is provided, reversed; and the parts are given the same reference characters as the parts on the left side to identify them, but with the suffix A, and further description is not needed.

This construction is again a one-piece molded device, and provides a space 27A open at both ends, and wires from panel devices may have entrance thereto from either end of the one-piece device.

It will be noted that both the inner chambers 6—6 and 6A—6A open into the space 27A, and the ends of the wires in the space 27A have nothing between them and the wire attaching devices 10 or 10A in the chambers, and can be connected directly to them; which as mentioned above, is a primary advantage of the form of FIGS. 1 to 4.

This form of the invention, as will be apparent, has two longitudinal series of straps 8—8 and 8A—8A; and therefore can be shorter, than the form of FIGS. 1 to 4, for the same number of wires from the panel devices connected to them.

Also the attaching devices 11 and 11A on the terminals being on opposite sides of the device, it is convenient to use this form of the device when outgoing wires from the wire attaching devices are to be connected to parts of apparatus to be controlled that are widely separated to eliminate the necessity of crossing the wires.

I claim:

1. A terminal board construction for use in control panels of electrical control apparatus, comprising a longitudinal floor portion having integral substantially parallel first and second sidewalls, the free end of the first of said sidewalls including a longitudinal flange, said second sidewall being spaced from said first sidewall and including oppositely extending shelf portions substantially parallel to and spaced above said floor portion, a longitudinal web integral with said shelf portions, a series of transverse walls radially extending from the opposed sides of and intersecting said web, a plurality of straps extending through said web substantially parallel to said shelf portions with one each of said plurality positioned within the confines formed by the shelf portions, the web and said transverse walls, said transverse walls including posts having offstanding flanges substantially coplanar with the flange carried by the free end of the first sidewall, said sidewalls thereby being adapted to receive a cover and to form a wire-receiving chamber in the area therebeneath.

2. A terminal board construction as claimed in claim 1, wherein the lateral edges of the cover are provided with inwardly projecting flanges adapted to engage the flanges carried by the first and second sidewalls.

3. A terminal board construction as claimed in claim 1 wherein the first sidewall is provided with a plurality of apertures serving to facilitate entry of wires to said chamber.

4. A terminal board construction as claimed in claim 1 wherein the first sidewall is constructed of a flexible material thereby permitting bending thereof to attach or remove the cover from engagement with the several sidewalls.

5. A terminal board construction for use in control panels of electrical control apparatus, comprising a longitudinally extending floor portion integral with spaced sidewalls, at least one of said sidewalls including oppositely extending inner and outer shelf portions substantially parallel to and spaced above said floor portion, a longitudinal web integral with said shelf portions, a series of transverse walls laterally extending from the opposed sides of and intersecting said web, a plurality of straps extending through said web substantially parallel to said shelf portions with one each of said plurality positioned within the confines formed by the shelf portions, the web and said transverse walls, a flanged support integral with and carried by the innermost of said shelf portions adapted to cooperate with a flanged support carried by the other of said sidewalls and thereby arranged to receive a cover and to form a wire-receiving chamber in the area therebeneath.

6. A terminal board construction as claimed in claim 5, wherein the lateral edges of the cover are provided with inwardly projecting flanges adapted to engage the flanges carried by the shelf portion and the other side wall.

7. A terminal board construction for use in control panels of electrical control apparatus, comprising a longitudinal floor portion having integral substantially parallel first and second spaced apart side walls, each of said side walls including oppositely extending inner and outer shelf portions substantially parallel to and spaced above said floor portion, a longitudinal web integral with said shelf portions, a series of transverse walls laterally extending from the opposed sides of and intersecting said web, a plurality of straps extending through said web substantially parallel to said shelf portions with one each of said plurality positioned within the confines formed by the shelf portions, the web and said transverse walls, a flanged support integral with and carried by the innermost of said shelf portions of each said side wall and adapted to cooperate with each other to thereby receive a cover and to form a wire receiving chamber in the area therebeneath.

8. A terminal board construction as claimed in claim 7, wherein the lateral edges of the cover are provided with inwardly projecting flanges adapted to engage the flanges carried by each shelf portion.

References Cited in the file of this patent

UNITED STATES PATENTS

| | | |
|---|---|---|
| 2,284,462 | Williams | May 26, 1942 |
| 2,434,918 | Gall | Jan. 27, 1948 |
| 2,545,898 | Schmitt | Mar. 20, 1951 |
| 2,597,286 | Burgess | May 20, 1952 |
| 2,610,996 | Rickabaugh | Sept. 16, 1952 |
| 2,787,773 | Potter | Apr. 2, 1957 |
| 2,830,281 | Robb | Apr. 8, 1958 |

FOREIGN PATENTS

| | | |
|---|---|---|
| 1,086,548 | France | Aug. 11, 1954 |